(12) United States Patent
Hatami Hanza (10) Patent No.: US 6,445,837 B1
(45) Date of Patent: Sep. 3, 2002

(54) HYBRID OPTO-ELECTRONIC CIRCUITS AND METHOD OF MAKING

(75) Inventor: Hamid Hatami Hanza, Ottawa (CA)

(73) Assignee: Nu-Wave Photonics, Inc., Ottawa (CA)

( * ) Notice: Subject to any disclaimer, the term of this patent is extended or adjusted under 35 U.S.C. 154(b) by 0 days.

(21) Appl. No.: 09/281,841

(22) Filed: Mar. 31, 1999

(51) Int. Cl.$^7$ ............................. G02B 6/12; G02B 6/26
(52) U.S. Cl. ............................ 385/14; 385/15; 385/129
(58) Field of Search ............................... 385/14, 15, 24, 385/31, 38, 39, 48–52, 129–131

(56) References Cited

U.S. PATENT DOCUMENTS

| | | | |
|---|---|---|---|
| 4,729,618 A | * 3/1988 | Yoshida et al. | 385/14 |
| 4,735,677 A | 4/1988 | Kawachi et al. | 156/633 |
| 4,750,799 A | 6/1988 | Kawachi et al. | 385/14 |
| 4,927,781 A | 5/1990 | Miller | 438/31 |
| 5,121,457 A | 6/1992 | Foley et al. | 385/89 |
| 5,535,296 A | 7/1996 | Uchida | 385/89 |
| 5,562,838 A | 10/1996 | Wojnarowski et al. | 216/24 |
| 5,600,745 A | 2/1997 | Wuu et al. | 385/49 |
| 5,611,006 A | * 3/1997 | Tabuchi | 385/14 |
| 5,708,741 A | 1/1998 | DeVeau | 385/49 |
| 5,719,979 A | 2/1998 | Furuyama | 385/89 |
| 5,734,155 A | 3/1998 | Rostoker | 250/208.1 |
| 5,737,458 A | 4/1998 | Wojnarowski et al. | 385/15 |
| 5,757,986 A | 5/1998 | Crampton et al. | 385/2 |
| 5,761,350 A | 6/1998 | Koh | 385/14 |
| 5,787,214 A | 7/1998 | Harpin et al. | 385/49 |
| 5,853,626 A | 12/1998 | Kato | 364/1.25 |
| 5,854,868 A | 12/1998 | Yoshimura et al. | 385/50 |

FOREIGN PATENT DOCUMENTS

CA 2258103 1/1999

OTHER PUBLICATIONS

Tachikawa, Y.; Okamoto, K.; Inoue, Y. amd Tanaka, T.; Optical Add–drop Multiplexers and Multi–wavelength Optical Sources for WDM Transmission Systems; *NTT Review*, vol. 10, No. 1, Jan. 1998, pp. 52–59.

Chisham, J.E.; Andrews, M.P.; Li, C–Y.; Najafi, S.I. and Malek–Tabrizi, A.; Gratings Fabrication by Ultraviolet Light Imprinting and Embossing in a Sol–Gel Silica Glass; *SPIE*, vol. 2695, pp. 52–55, (1996).

Coudray, P.; Chisham, J.; Malek–Tabrizi, A.; Li. C.Y.; Andrews, M. and Najafi, S.I.; UV–light imprinted sol–gel silica glass waveguide 1x8 beam splitter on silicon; *SPIE*, vol. 2695, pp. 92–97, (1996).

\* cited by examiner

*Primary Examiner*—John D. Lee
(74) *Attorney, Agent, or Firm*—Salter & Michaelson (57) ABSTRACT

A method of hybrid integration of optical and electronic devices is disclosed. Optical waveguides and electrical interconnections are formed on a substrate coated with a photosensitive core layer sandwiched between an inner cladding layer and outer cladding layer, after mounting the devices within one or more recesses carved in the substrate and the coated layers. Adaptive lithography is used to create the desired pattern of waveguides and other deflecting optical elements within the core layer to correspond with the positions of the optical and electronic devices relative to the substrate.

35 Claims, 6 Drawing Sheets

HYBRID OPTO-ELECTRONIC CIRCUITS AND METHOD OF MAKING

FIELD OF THE INVENTION

The present invention generally relates to integrated opto-electronic devices and waveguide circuits and more particularly to the hybrid integration of the active and passive optical elements and electronic chips on a common substrate.

BACKGROUND OF THE INVENTION

Large-scale integration of optical devices and elements is desirable to decrease the cost and increase the functionality of optical and opto-electronic devices and circuits. Two major integration methods are currently under the development—the monolithic approach and the hybrid approach. In the monolithic approach, all components such as laser sources, passive waveguide devices, detectors and so on are made on a common substrate from the same material such as silicon or InGaAsP series. In the hybrid approach, different components made of possibly different materials are mounted on a common substrate and are connected to each other by optical waveguides fabricated on the same substrate. In the hybrid approach, the waveguides are made of high-silica glasses that show very low propagation loss, whereas in the monolithic approach the waveguides are made of the same materials as the other components which are normally semiconductors and therefore are highly absorptive. Moreover monolithic integration of optical components may become very expensive since the fabrication process of the different optical elements are not compatible and could be destructive to one another resulting in a low yield.

Therefore, the hybrid integration is a more feasible yet more versatile approach. In U.S. Pat. No. 4,735,677, issued in April 1988, a method for fabricating hybrid optical integrated circuits is disclosed. In that method, optical fibers and semiconductor devices (e.g., laser diodes and detectors) are disposed on predetermined positions on a board and are aligned to pre-made waveguides by pre-made guides. The waveguides and guides are made on a substrate in one process and then the optical elements are placed on the pre-determined positions between the aligning guides. Positioning the devices into the guides and the optical alignment of the devices with the pre-made optical waveguide become very critical and time consuming resulting in expensive hybrid integrated circuits.

In U.S. Pat. No. 5,854,868 issued on Dec. 29, 1998, there is a disclosure of another fabrication method for hybrid integration of optical devices to waveguides. In that method, optical devices are first mounted on predetermined positions, while optical waveguides with a desired refractive index profile are fabricated afterwards. Provided that the optical devices are mounted on their ideal positions, one can quickly align the waveguides to their respective optical devices by means of markers and using a mask aligner. However, the optical devices are mounted manually on their predetermined positions by means of a solder, where it is very difficult to control the position of the mounted devices within the necessary precision, e.g. less than a micrometer. Therefore, this method will also suffer from misalignment errors.

In U.S. Pat. No. 5,737,458 and U.S. Pat. No. 5,562,838 adaptive lithography is employed to interconnect the optical elements already mounted on the substrate. In these disclosures, a laser milling process is proposed to create micro-channels for forming waveguides by filling the channels with a material with a slightly higher refractive index or to etch away the surface of the substrate coated with the waveguide material to form the channel waveguides for interconnection. However, laser milling or ablation may damage the optical elements mounted on the substrate and also results in waveguides with rough surfaces, which will have high scattering losses. Moreover, the laser ablation process employed in that method does not necessarily provide sufficient precision required for the optical alignments.

There is, therefore, a need for a method of hybrid integration that can solve the problem of incompatibility of the fabrication method and the alignment of the optical devices in a cost effective and feasible manner.

SUMMARY OF THE INVENTION

It is therefore an object of the present invention to provide a feasible method of hybrid integration of optical and electronic devices and components suitable for reducing misalignment errors.

To circumvent the problems mentioned above, the present invention provides a method for seamless hybrid integration of optical and/or electronic devices on a substrate. The method comprises of forming at least one layer of high silica glasses on a substrate and with mounted optical elements thereon. Optical elements in this invention include, but are not restricted to, devices such as lasers, detectors, lenses, prisms, isolators, waveguide bends, integrated optic devices with input and output, and the like. A device in this invention refers to any one of optical elements, electronic components and integrated circuits, as well as other opto-electronic devices.

At least one of the layers is a photosensitive glass layer in which refractive index or solubility is changed by exposure to a particular spectrum of electromagnetic radiation such as Ultra Violet (UV) light. The photosensitive layer is used as the core region of the waveguide interconnection circuit that will be printed by UV exposure. The substrate is etched or carved at the predetermined position with the predetermined depth such that the emitting and receiving areas of the optical devices are aligned vertically to the core layer level (i.e. the photosensitive layer).

The photosensitive layer may or may not be covered by another layer or layers of silica glass, which are almost transparent to that particular spectrum of electromagnetic radiation.

The substrate with deposited layer or layers of thin film glasses and with the optical elements mounted in the pre-made cavities is masked with a masking material such as chromium. Waveguides or other optical element patterns are then written on the upper layer by a suitable way such as adaptive electron-beam lithography. The substrate with the mask attached on it is then exposed to the light radiation (e.g. UV light) so that waveguides are created in the core layer and optical elements become optically interconnected. The mask pattern may contain lenses and micro prisms that will also be fabricated at the same time at the desired places or junctions. The spot-size of the different optical devices is matched either by the integrated lens or by appropriate tapering of the waveguide widths in the lateral axis and is vertically controlled by double exposure or by further selective exposure to a UV radiation. Alternatively, the waveguides are written by direct laser writing by means of moving either the laser beam or moving the substrate under the laser beam to fabricate the necessary interconnections.

For a precise alignment of optical waveguides to the optical devices, the exact position of mounted devices is detected by an imaging system that can then control a laser beam or an electron beam over the substrate. For instance, the image processor recognizes the actual positions of the devices on the substrate and transfers the pattern to a computer-controlled electron beam lithography machine to cerate a mask on the upper layer that will perfectly align the waveguides to the optical devices.

In accordance with a first aspect of the invention, there is provided a method for integrating at least one device on a substrate, comprising the steps of:
  (a) coating a first side of said substrate with at least one layer including a core layer suitable for guiding light;
  (b) carving at least one recess in said first side of the substrate and said at least one layer;
  (c) mounting the at least one device in said at least one recess; and
  (d) forming an optical waveguide coupled to said at least one device within said core layer.;
  wherein said optical waveguide corresponds to a position of said at least one device relative to the substrate.

In accordance with a further aspect of the present invention there is provided a method for integrating at least one device on a substrate, comprising the steps of:
  (a) coating a first side of said substrate with at least one layer including a core layer made of a photosensitive material;
  (b) carving at least one recess in the first side of said substrate and said core layer;
  (c) depositing an electrical connector in said at least one recess;
  (d) mounting at least one device in said at least one recess;
  (e) obtaining an image of the first side of said substrate with said at least one device;
  (f) forming a mask in accordance with said image using electron beam lithography; and
  (g) exposing a portion of the core layer to a light beam through said mask to shape an optical waveguide through a change in refractive index of exposed portion of the core layer.

The at least one layer preferably includes an inner cladding layer between the substrate and one side of the core layer, and an outer cladding layer at another side of the core layer.

Preferably, an electrical connector is deposited in the at least one recess after the carving step and before the forming step. Following the mounting step, a portion of the recess surrounding the at least one device is preferably filled by a photosensitive material, followed by forming at least one optical deflector within the photosensitive material positioned between the at least one device and the optical waveguide.

In an embodiment of the present invention, an optical waveguide is formed by the steps of obtaining an image of the first side of the substrate to identify a position of said at least one device relative to the substrate, and then defining a shape of the optical waveguide in accordance with the position of said at least one device. The definition of waveguide shape is conveniently determined with the aid of at least one positioning marker by forming a mask in accordance with the position of said at least one device, and then exposing a portion of the core layer to an ultraviolet light beam through said mask to effect a change in refractive index of an exposed portion of the core layer and to form the optical waveguide through said exposed portion. The mask can practically be formed with either electron beam lithography, or by direct laser writing of the optical waveguide on the substrate in accordance with the position of said at least one device.

In accordance with another aspect of the present invention, there is provided a hybrid integrated circuit comprising:
  (a) a substrate having a first side coated with at least one layer including a core layer suitable for guiding light;
  (b) at least one recess carved in said first side of said substrate and said at least one layer;
  (c) at least one device mounted in at least one recess;
  (d) an optical waveguide coupled to said at least one device;
  wherein said optical waveguide is formed within said core layer to correspond a position of said at least one device relative to the substrate.

Preferably, a portion of the recess surrounding the at least one device is filled by a photosensitive material.

The hybrid integrated circuit can also have at least one optical deflector formed within the photosensitive material and positioned between the at least one device and the optical waveguide. The at least one optical deflector can either be a lens or a micro-prism. In addition, the integrated optical circuit can include at least one optical fiber terminal coupled to the said at least one optical waveguide, and adapted to receive an optical fiber having a core aligned to the core layer. Practically, this optical fiber is embedded within the core layer.

The at least one device can include a laser diode, and/or a modulator. The optical waveguide can also have a Bragg grating section. Additional elements that can be integrated within the hybrid circuit include an electronic integrated circuit mounted in the recess and electrically coupled to the at least one device.

In summary, the present invention provides a method of fabricating and interconnecting optical devices with state-of-the-art alignment precision using a common board and applying adaptive electron beam lithography or direct laser writing. Furthermore, the invention reveals a method for formation of lenses, micro-prisms, spot-size adapters, and gratings incorporated in waveguide interconnections of mounted optical devices. The method is suitable for low-cost volume production of hybrid integrated optical circuits and devices.

BRIEF DESCRIPTION OF THE DRAWINGS

Exemplary embodiments of the invention will now be further described with references to the drawings in which same reference numerals designate similar parts throughout the figures thereof, and wherein.

DETAILED DESCRIPTION OF PREFERRED EMBODIMENTS

The present invention relates to a process in which at least one optical element is optically interconnected to at least another optical element or at least one optical fiber. Reference will now be made to the accompanying drawings to describe the present invention.

Figure 1A:
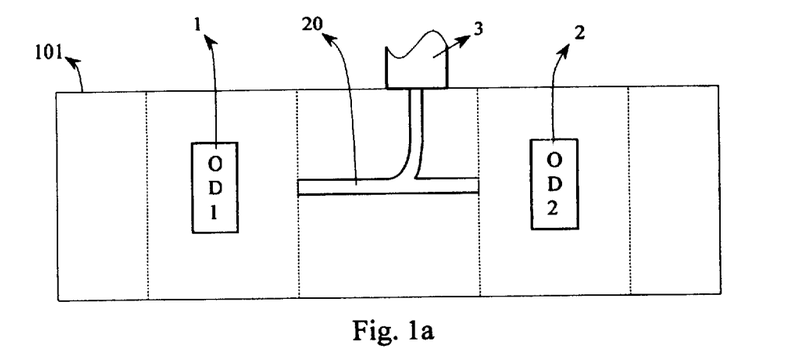
FIGS. 1a, 1b, 1c, and 1d illustrate in a top view, a cross-section view and two perspective views respectively of a hybrid integrated opto-electronic circuit according to a first embodiment of the invention.

FIG. 1a shows a first embodiment of a hybrid integrated optical circuit 101 made by a process according to the present invention, in which two optical devices 1 and 2 and an optical fiber terminal 3 are interconnected optically. Each of the optical devices 1 and 2 can be any one of a semiconductor laser source, an optical isolator, a modulator, a discrete lens, a photo-diode, or the like.

Figure 1B:
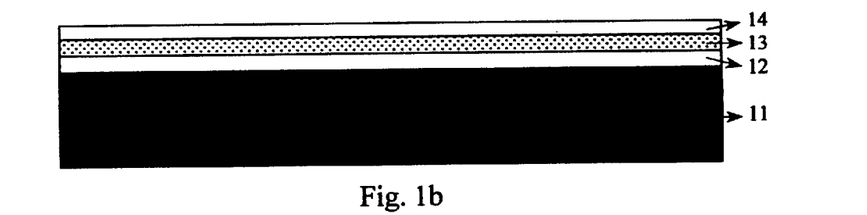
Figure 1C:
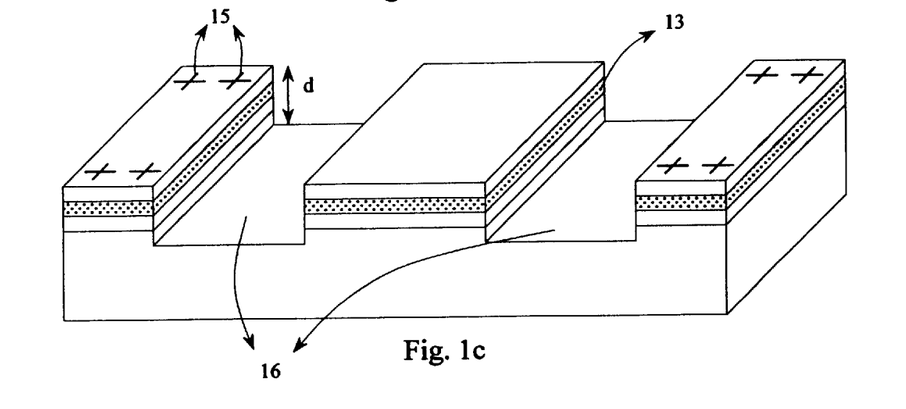
Figure 1D:
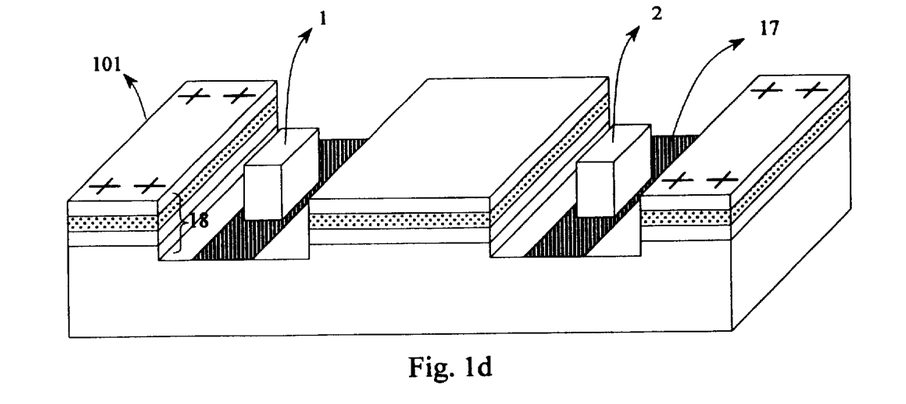

The hybrid circuit 101 contains a substrate 11, as shown in FIG. 1b, which is first coated with three layers of materials to form a lower (inner) cladding 12, a core layer 13, and an upper (outer) cladding 14 where there are printed positioning markers 15 on the surface or edges of the upper cladding 14 for recognition of positions and for alignment purposes. Although in this embodiment three layers are used, in principle there could be any desired number of layers. Alternatively, the lower cladding 12 might be the substrate 11 itself and the upper cladding 14 can be simply air. It is preferable that the coated materials of the three layers 12–14 have relatively low absorption at a prescribed wavelength, i.e. at 1.5 micrometers. The core layer 13 is photosensitive in which the refractive index or solubility is changed by exposure to a particular spectrum of light. Next, the substrate 11 is etched or carved in the designated areas by an associated method such as using a dicing saw, laser ablation or any other applicable etching and carving method, to create a carved area (recess) 16. In preferred embodiments, the dicing saw or the like creates the carved area 16 in the form of U a groove or canal, as shown in FIG. 1c. Then, electrodes (electrical connectors) 17 with the desired shape are deposited in the carved areas 16 and optical devices 1 and 2 are mounted in the designated areas without requiring an effort to place them on their ideal positions, as shown in FIG. 1d. The emitting and receiving areas of the optical devices 1 and 2 as well as the optical fiber core inside the fiber terminal 3 are aligned with the photosensitive core layer 13. The next step is to write a pattern (shape) 20 of waveguides and refractive index profile as shown in FIG. 1a by way of recognition of the actual positions of the optical devices 1 and 2 with the aid of markers 15 and image recognition processing and apparatus (not shown). The substrate 11 is then masked with a metal or any other material suitable for masking and then coated with a resist material. Then a masking pattern for the associated waveguide pattern 20 is created on the surface of upper cladding 14 by direct electron beam writing using the information from the image processing apparatus. The direct writing by electron beam ensures that the waveguide pattern 20 is aligned to the optical devices. The substrate 11 with a patterned mask thereon is then exposed to light to create the waveguide pattern 20 or other refractive index profiles in the core layer 13.

Figure 2A:
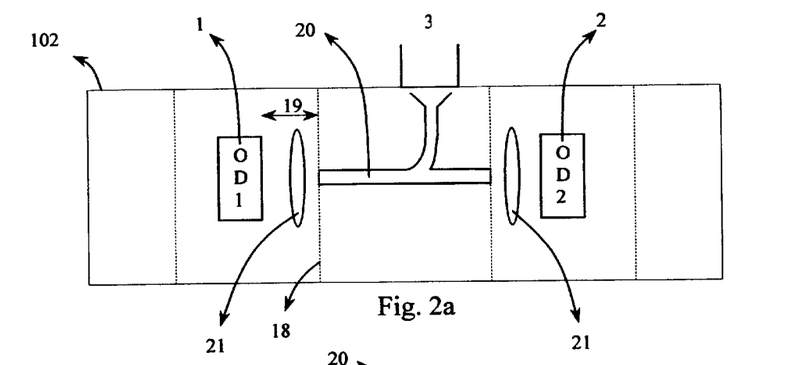
FIGS. 2a and 2b illustrate in two top views a hybrid integrated opto-electronic circuit according to a second embodiment of the innovation in which an optical elements is coupled to the waveguide through an integrated lens.
Figure 2B:
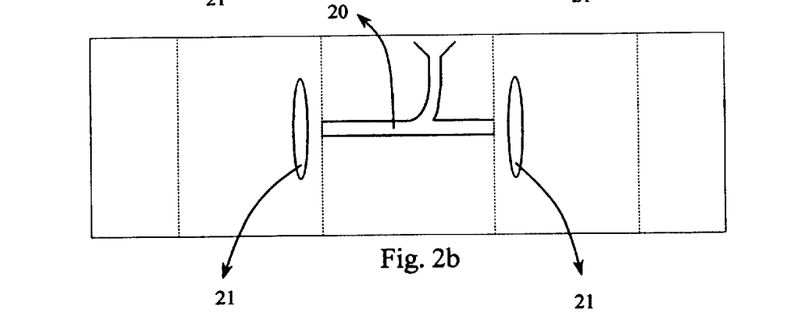

FIG. 2a shows a top view of a second embodiment of a hybrid circuit 102 in which there is a gap 19 between the optical devices 1 and 2 and the side walls 18 of the three coated layers 12–14 as shown in FIG. 1d. The gap 19 is then filled with a photosensitive material such as polymer or Sol-Gel up to the surface of the devices 1 and 2 and the upper layer 14. The preferred layout, as shown in FIG. 2b includes optical lenses 21, are formed by light exposure in the gap 19 between the optical devices 1 and 2 and the waveguide 20 also formed in the core layer 13 by light exposure after the adaptive electron beam lithography direct patterning.

Figure 3A:
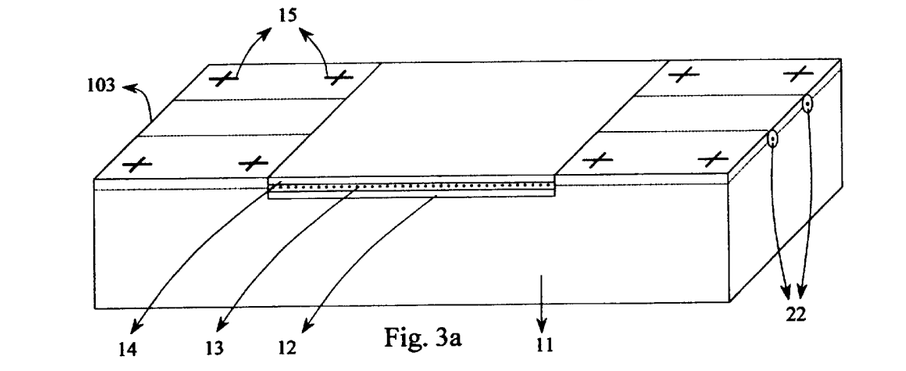
FIGS. 3a, 3b, 3c, 3d, 3e, 3f, and 3g illustrate in perspective and top views a hybrid integrated opto-electronic circuit according to a third embodiment of the invention.

FIG. 3a shows a side view of a third embodiment of a substrate 11 with three coated layers 12–14 in which a photosensitive layer 13 (i.e. core layer) has been sandwiched between the two layers of lower cladding 12 and upper cladding 14. As seen, fibers 22 have been embedded in the substrate 11 so that the cores of the fibers are aligned with the core layer 13. Pre-embedded fibers 22 in the substrate 11 facilitate the attachment of the fiber to the integrated optical devices 4 and 5 as is disclosed in Canadian application #2,258,103 entitled, "An Integrated Optical Board Comprising Integrated Optic Waveguide Circuit Modules", by H. Hatami-Hanza and V. Behnam.

Figure 3B:
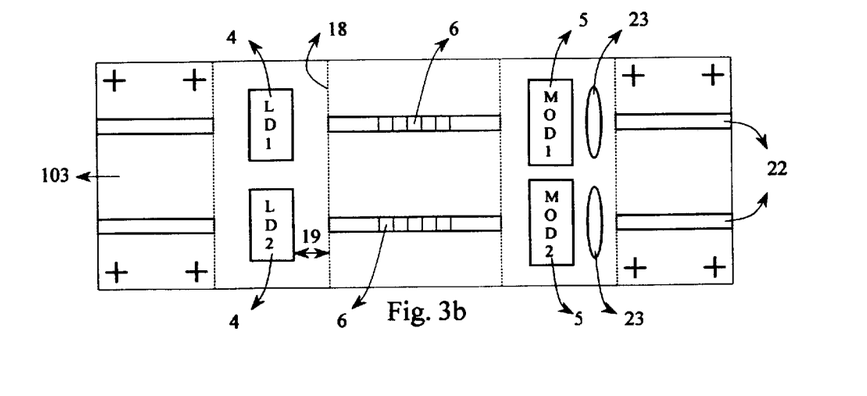
Figure 3C:
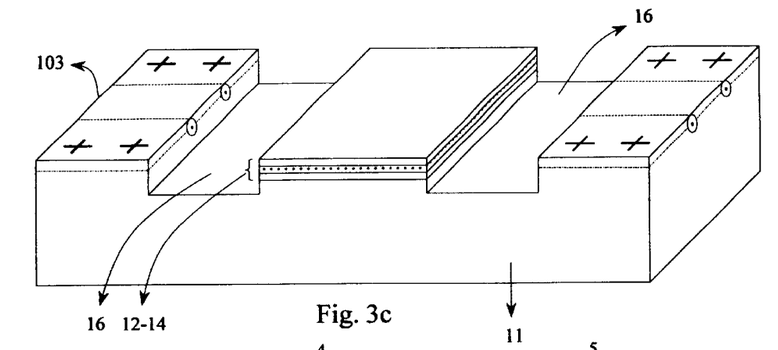
Figure 3D:
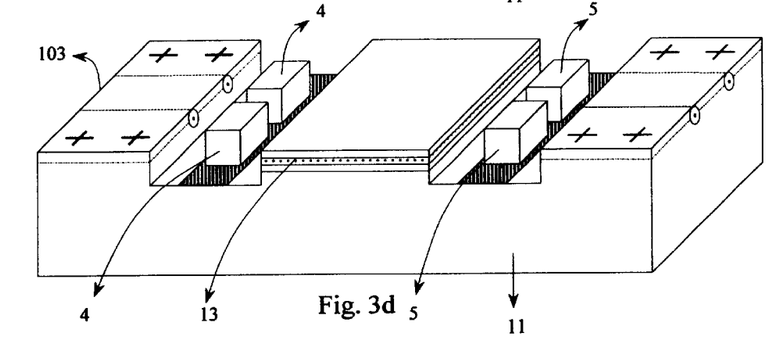
Figure 3E:
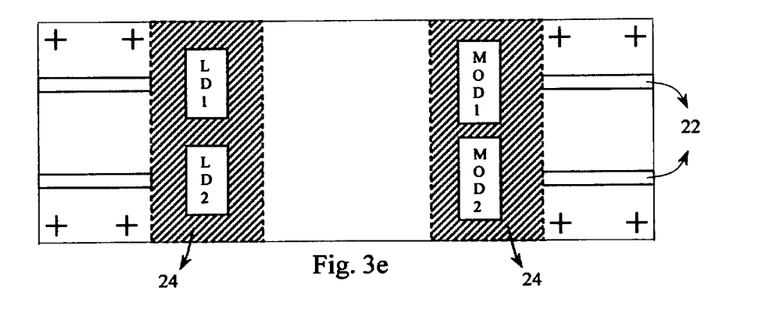

FIG. 3b shows a hybrid circuit 103 that is fabricated on the substrate 11 of FIG. 3a using the present invention process. The circuit contains two laser diodes 4 that are coupled to two Bragg grating waveguides 6 and forming external cavity lasers. Laser light is launched into two modulators 5 and the output is coupled to optical fibers 22 through the integrated lenses 23. FIGS. 3c, 3d and 3e show the steps in which the circuit is fabricated in accordance to the method of the present invention. In this exemplary situation, two canals 16 are carved in the substrate 11 coated with three layers 12–14, as shown in FIG. 3c. The optical devices 4 and 5 are mounted in the canals 16 and are electrically connected such that their light emitting or receiving areas fall in the core layer level 13, as shown in FIG. 3d. It is preferable to have the upper surface of the optical devices 4 and 5 and the upper layer 14 being in the same surface plane. The depth of the canals or thickness of the layers can be varied to meet these conditions. The gap 19 between the optical devices and the sidewalls 18 of the coated layers 12–14 and the embedded fiber 22 is then filled with a photosensitive or index matching material 24, as required, as shown in FIG. 3e. When fabricating integrated lenses, the gap is filled by photosensitive material.

Figure 3F:
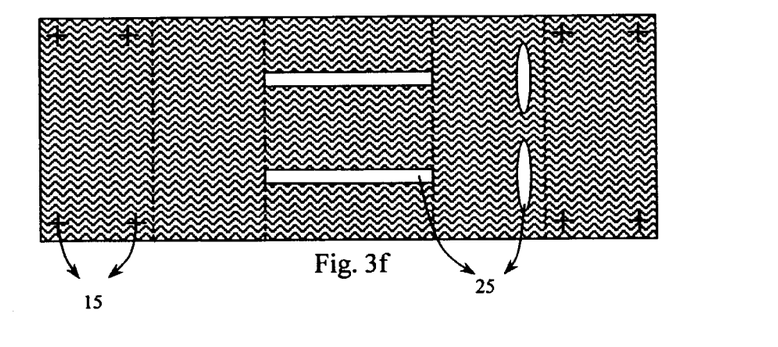

The next step is to map the hybrid circuit 103 by high resolution viewing and imaging processes to find the exact positions of the optical devices and store the information in a computer system so that another scanning machine such as an electron beam machine can identify the objects on the substrate. The next step is to use the location map of the optical elements on the substrate and to employ electron beam lithography for creating a pattern mask, as shown in FIG. 3f, corresponding to the waveguides and/or lenses and prisms, over the upper layer surface 14. The position of the electron beam in an electron beam lithography machine can be controlled with sub-micrometer precision. Therefore, a precise optical alignment of the waveguides with the optical elements is possible.

Figure 3G:
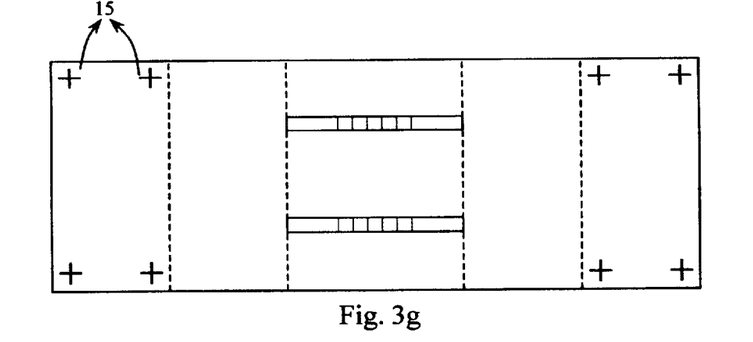

In this particular embodiment of a hybrid circuit device, a waveguide grating is also used. To write a good quality grating, a phase mask is required. FIG. 3g shows the schematic of the phase mask pattern which will be placed on the surface of the circuit and is aligned to its predetermined position by the aid of the markers 15 as shown in FIGS. 3a, 3f and 3g. It is also possible to leave the embedded fibers in the substrate for writing grating on the embedded fibers.

Figure 4:
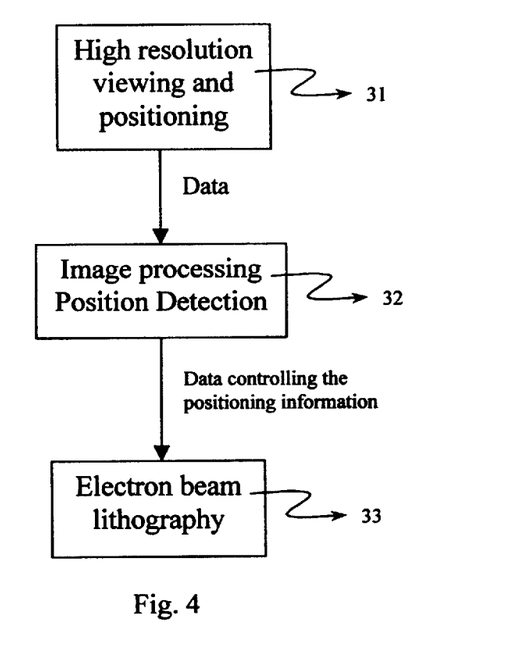
FIG. 4 shows a flowchart of the adaptive electron beam lithography procedure according to the present invention.

FIG. 4 shows a flow chart of the adaptive electron beam lithography according the present invention. The high resolution imaging and processing system 31 through an image processing and position detection process 32 will map the substrate with the optical elements mounted thereon and feed the information to the electron beam machine 33, so as to control the electron beam writing on the substrate coated with a masking material such as chromium and deposited with the associated resist for the lithography process.

After pattering the mask on the surface, the substrate is exposed to the light for which the core layer is photosensitive. By monitoring the intensity and exposure time, the amount of change in the refractive index and the depth of the waveguides is controlled. This step can be done while the hybrid circuit is in operation and the desired output is being monitored while the hybrid circuit with the mask attached to the surface is exposed to the light for which the core layer is photosensitive. The exposure continues until the desirable response is seen from the output. The desirable response in most cases is the maximum output power, which shows that maximum coupling between the optical elements has occurred.

Furthermore, employing more than one stage of lithography or exposure can create the desired refractive index profile, e.g. tapered waveguides in lateral and vertical dimensions.

Figure 5A:
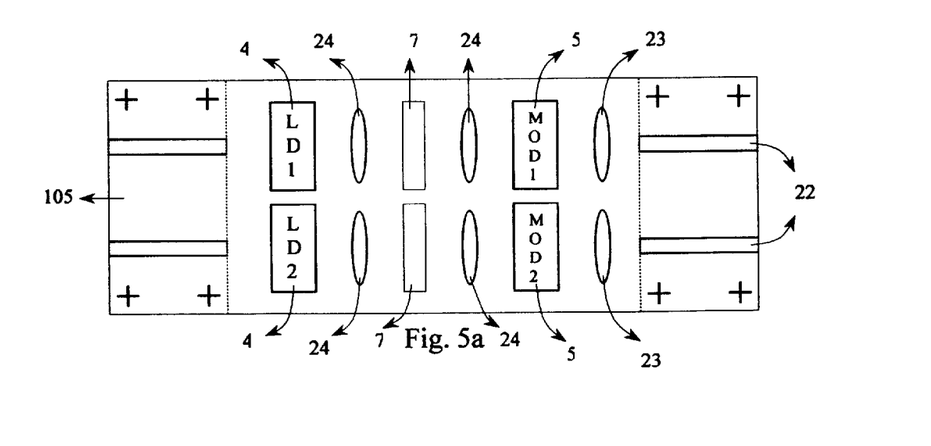
FIGS. 5a, 5b, and 5c illustrate in a top view and two perspective views a hybrid integrated opto-electronic circuit of a fourth embodiment of the present invention.
Figure 5B:
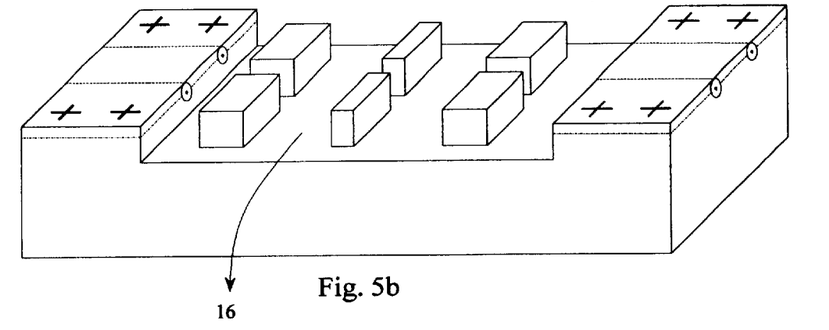
Figure 5C:
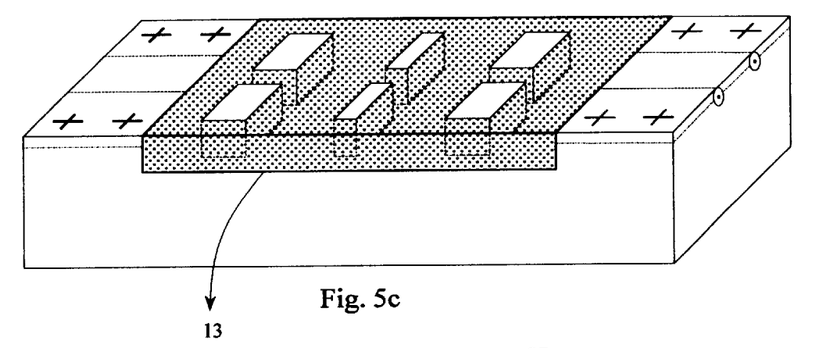

FIG. 5a illustrates a fourth embodiment of the optoelectronic hybrid circuit 105 according to the present invention in which two laser diodes 4 are coupled to two modulators 5 wherein lenses 23 and 24 and isolators 7 are also integrated in between. An integrated optic board with embedded fiber 22 therein is carved out and the optical devices 4, 5 and 7 are mounted over the surface of the carved area 16, as shown in FIG. 5b. The areas in between the optical devices 4,5 and 7 are then filled with a photosensitive substance, as shown in FIG. 5c, and adaptive lithography as explained above is employed to create the coupling lenses 23 and 24 with the desired refractive index profile.

Figure 6A:
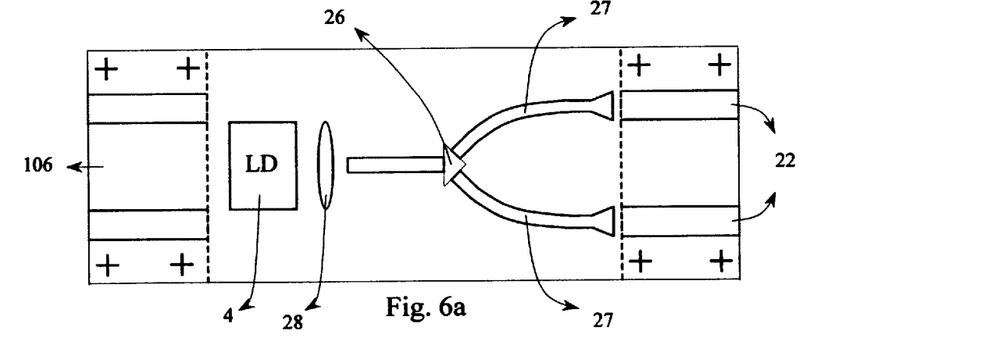
FIGS. 6a and 6b illustrate in top views a hybrid integrated opto-electronic circuit, which contains lenses and prisms, according to a fifth embodiment of the invention.
Figure 6B:
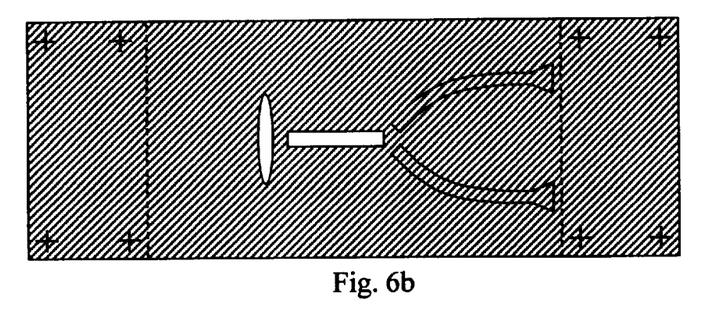

FIG. 6a shows a fifth embodiment for optical hybrid circuit 106 and FIG. 6b shows the mask pattern that the electron beam will create on the surface adaptively. The pattern contains a lens 28 and a prism 26 to shorten the length of the interconnecting waveguides 27 as is described in an article by the applicant in *IEEE Photonics Technology letters*, vol.6, no. 4, pp. 528–530, 1994.

Figure 7:
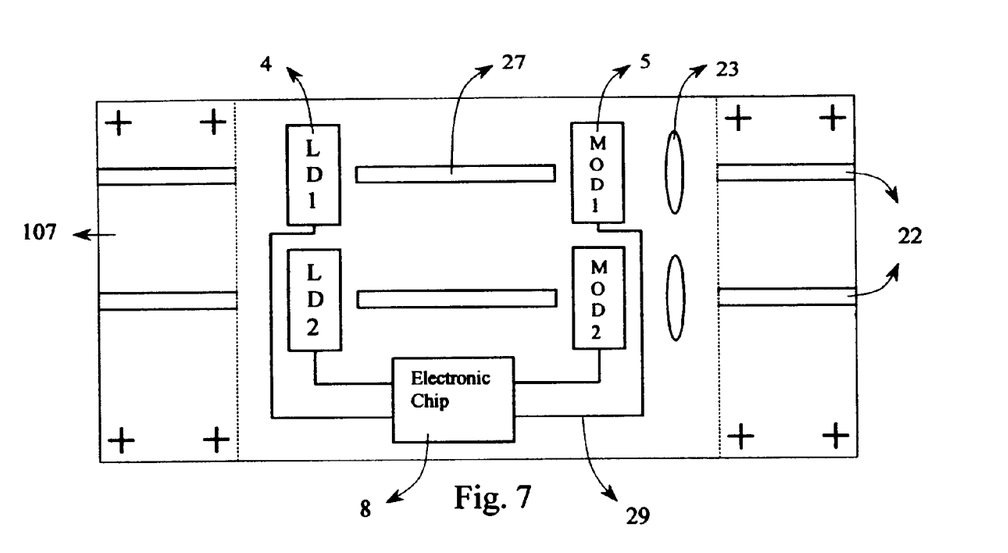
FIG. 7 illustrates in a top view a hybrid opto-electric circuit according to a sixth embodiment of the present invention in which optical elements and electronic elements and circuits are integrated on a common substrate.

FIG. 7 shows a sixth embodiment of a hybrid circuit 107 that comprises an electronic chip 8 and optical devices 4 and 5 and electrical connections 29. Optical devices 4 and 5 and electronic chips 8 are mounted in the pre-determined cavities and they are optically and electrically interconnected by the described adaptive electron beam lithography. The optical devices 4 and 5 first are optically interconnected and then having known the actual position of the optical devices and electronic chips, the electrical interconnections 29 are also done by depositing a suitable conductor and pattering the electrical interconnections also by electron beam lithography.

It will be understood that various modifications could be made by those skilled in the art without departing from the scope and spirit of the present invention.

What is claimed is:

1. A method for integrating at least one device on a substrate, comprising the steps of:
    (a) coating a first side of said substrate with at least one layer including a core layer suitable for guiding light;
    (b) carving at least one recess in said first side of the substrate and said at least one layer;
    (c) mounting the at least one device in said at least one recess;
    (d) filling a portion of the recess surrounding the at least one device by a photosensitive material;
    (e) forming an optical waveguide coupled to said at least one device within said core layer; and
    (f) forming at least one optical deflector within the photosensitive material positioned between the at least one device and the optical waveguide;
    wherein said optical waveguide corresponds to a position of said at least one device relative to the substrate.

2. A method for integrating at least one device on a substrate as defined in claim 1 wherein the core layer is a photosensitive material.

3. A method for integrating at least one device on a substrate as defined in claim 1 wherein step c) comprises depositing an electrical connector in the at least one recess.

4. A method for integrating at least one device on a substrate as defined in claim 1, wherein the at least one layer further includes an inner cladding layer between the substrate and one side of the core layer, and an outer cladding layer at another side of the core layer.

5. A method for integrating at least one device on a substrate as defined in claim 1, wherein said step of forming an optical waveguide includes:
    obtaining an image of the first side of the substrate to identify a position of said at least one device relative to the substrate; and
    defining a shape of the optical waveguide in accordance with the position of said at least one device.

6. A method for integrating at least one device on a substrate as defined in claim 5, wherein the defining step is aided with at least one positioning marker.

7. A method for integrating at least one device on a substrate as defined in claim 5, wherein said defining step includes:
    forming a mask in accordance with the position of said at least one device; and
    exposing a portion of the core layer to a light beam through said mask to effect a change in refractive index of an exposed portion of the core layer and to form the optical waveguide through said exposed portion.

8. A method for integrating at least one device on a substrate as defined in claim 7, wherein said step of forming a mask is performed with electron beam lithography.

9. A method for integrating at least one device on a substrate as defined in claim 7, wherein said light beam includes ultraviolet light.

10. A method for integrating at least one device on a substrate as defined in claim 5, wherein said defining step is performed by direct laser writing of the optical waveguide on the substrate in accordance with the position of said at least one device.

11. A method for integrating at least one device on a substrate, comprising the steps of:
    (a) coating a first side of said substrate with at least one layer including a core layer made of a photosensitive material;
    (b) carving at least one recess in the first side of said substrate and said core layer;
    (c) depositing an electrical connector in said at least one recess;
    (d) mounting at least one device in said at least one recess;

(e) obtaining an image of the first side of said substrate with said at least one device;

(f) forming a mask in accordance with said image using electron beam lithography; and (g) exposing a portion of the core layer to a light beam through said mask to shape an optical waveguide through a change in refractive index of exposed portion of the core layer.

12. A hybrid integrated optical circuit comprising:

(a) a substrate having a first side coated with at least one layer including a core layer suitable for guiding light;

(b) at least one recess carved in said first side of said substrate and said at least one layer;

(c) at least one device mounted in at least one recess;

(d) a photosensitive material filling a portion of the recess surrounding the at least one device;

(e) an optical waveguide coupled to said at least one device;

(f) at least one optical deflector formed within the photosensitive material and positioned between the at least one device and the optical waveguide;

wherein said optical waveguide is formed within said core layer to correspond to a position of said at least one device relative to the substrate.

13. A hybrid integrated circuit as defined in claim 12 wherein the core layer is a photosensitive material.

14. A hybrid integrated circuit as defined in claim 12, further comprising an electrical connector deposited in the at least one recess, and connected to said at least one device.

15. A hybrid integrated circuit as defined in claim 12, wherein the at least one optical deflector is a lens.

16. A hybrid integrated circuit as defined in claim 12, wherein the at least one optical deflector is a micro-prism.

17. A hybrid integrated circuit as defined in claim 12, further comprising at least one optical fiber terminal coupled to the optical waveguide.

18. A hybrid integrated circuit as defined in claim 17, wherein the optical fiber terminal is adapted to receive an optical fiber having a core aligned to the core layer.

19. A hybrid integrated circuit as defined in claim 18 wherein the optical fiber is embedded within the core layer.

20. A hybrid integrated circuit as defined in claim 12, wherein the at least one device includes a laser diode.

21. A hybrid integrated circuit as defined in claim 12, wherein the at least one device includes a modulator.

22. A hybrid integrated circuit as defined in claim 12, wherein the optical waveguide includes a Bragg grating section.

23. A hybrid integrated circuit as defined in claim 12, further comprising an electronic integrated circuit mounted in the recess and electrically coupled to the at least one device.

24. A hybrid integrated circuit comprising:

(a) a substrate having a first side coated with at least one layer including a core layer made of a photosensitive material;

(b) first and second recesses carved in said first side of said substrate and said at least one layer;

(c) first and second optical devices mounted in said first and second recesses respectively;

(d) first and second connectors deposited in said first and second recesses respectively, and coupled to said first and second optical devices respectively; and (e) an optical coupling configuration including a lens and an isolator for coupling said first optical device to said second optical device;

wherein said optical coupling configuration is formed within said core layer to correspond to positions of said first and second optical devices relative to the substrate.

25. A method for integrating at least one device on a substrate, comprising the steps of:

coating a first side of said substrate with at least one layer including a core layer suitable for guiding light;

carving at least one recess in said first side of the substrate and said at least one layer;

mounting the at least one device in said at least one recess; and forming an optical waveguide coupled to said at least one device within said core layer by obtaining an image of the first side of the substrate to identify a position of said at least one device relative to the substrate and defining a shape of the optical waveguide in accordance with the position of said at least one device;

wherein said optical waveguide corresponds to a position of said at least one device relative to the substrate.

26. The method of claim 25, wherein the core layer is a photosensitive material.

27. The method of claim 25, further comprising depositing an electrical connector in the at least one recess.

28. The method of claim 25, further comprising the step of filling a portion of the recess surrounding the at least one device by a photosensitive material.

29. The method of claim 28, further comprising the step of forming at least one optical deflector within the photosensitive material positioned between the at least one device and the optical waveguide.

30. The method of claim 25, wherein the at least one layer further includes an inner cladding layer between the substrate and one side of the core layer, and an outer cladding layer at another side of the core layer.

31. The method of claim 25, wherein the defining step is aided with at least one positioning marker.

32. The method of claim 25, wherein said defining step includes:

forming a mask in accordance with the position of said at least one device; and exposing a portion of the core layer to a light beam through said mask to effect a change in refractive index of an exposed portion of the core layer and to form the optical waveguide through said exposed portion.

33. The method of claim 32, wherein said step of forming a mask is performed with electron beam lithography.

34. The method of claim 32, wherein said light beam includes ultraviolet light.

35. The method of claim 25, wherein said defining step is performed by direct laser writing of the optical waveguide on the substrate in accordance with the position of said at least one device.

* * * * *